United States Patent [19]

Cohen et al.

[11] Patent Number: 5,282,249
[45] Date of Patent: Jan. 25, 1994

[54] SYSTEM FOR CONTROLLING ACCESS TO BROADCAST TRANSMISSIONS

[76] Inventors: Michael Cohen, 4/4 Frankfurter Street; Jonathan Hashkes, 75 Uziel Street, both of, Jerusalem, Israel

[21] Appl. No.: 993,823

[22] Filed: Dec. 18, 1992

Related U.S. Application Data

[63] Continuation of Ser. No. 611,960, Nov. 9, 1990, abandoned.

[30] Foreign Application Priority Data

Nov. 14, 1989 [IL] Israel ........................... 92310

[51] Int. Cl.$^5$ ........................... H04L 9/00; H04L 9/32
[52] U.S. Cl. ........................... 380/23; 380/9; 380/10; 380/21; 380/22; 380/30; 380/44; 235/380; 235/382; 340/825.31; 340/825.34
[58] Field of Search ............... 380/9, 10, 16, 21, 22, 380/23, 30, 44; 235/380–382; 340/825.31, 825.34

[56] References Cited

U.S. PATENT DOCUMENTS

| | | | |
|---|---|---|---|
| 2,977,434 | 3/1961 | Shanahan et al. | 200/46 |
| 3,890,461 | 6/1975 | Vogelman et al. | 380/16 |
| 4,012,583 | 3/1977 | Kramer | 380/16 X |
| 4,494,143 | 1/1985 | Lovick et al. | 380/16 |
| 4,748,668 | 5/1988 | Shamir et al. | 380/30 |
| 4,811,377 | 3/1989 | Krolopp et al. | 380/23 X |
| 4,993,066 | 2/1991 | Jenkins | 380/16 |

FOREIGN PATENT DOCUMENTS

| | | | |
|---|---|---|---|
| 59174/86 | 1/1988 | Australia | H04N 7/16 |
| 0200310 | 1/1986 | European Pat. Off. | H04N 7/20 |
| 0252680 | 1/1988 | European Pat. Off. | H04M 1/66 |
| 1083311 | 6/1960 | Fed. Rep. of Germany | H04N 7/16 |
| 3640680 | 6/1988 | Fed. Rep. of Germany | H04N 7/14 |
| 88/02899 | 4/1988 | PCT Int'l Appl. | H04N 7/167 |

OTHER PUBLICATIONS

Gale, B. and Baylin, F., Satellite and Cable TV Scrambling and Descrambling, Baylin/Gayle Productions, Boulder, Colo., 1986.

Svigals, J., Smart Cards, The New Bank Cards, Macmillan Publishing Company. 1985, New York.

The Art of Computer Programming vol. 3 Sorting and Searching, pp. 506–549, Mass.

The Art of Computer Programming, Second Edition, pp. 268–278, Mass.

*Primary Examiner*—Bernarr E. Gregory
*Attorney, Agent, or Firm*—Ladas & Parry

[57] ABSTRACT

A system for controlling access to broadcast transmissions including a transmitter having a transmission encoder for scrambling the broadcast, a multiplicity of subscriber receivers, each having an identical receiving decoder, containing no secret cryptographic keys, for descrambling the broadcast and a plurality of selectable and portable executing apparatus each being operatively associatable with a receiving decoder at a partially different given time and each executing generally identical operations to generate a seed for use by the associated receiving decoder to enable the receiving decoder to descramble the broadcast.

39 Claims, 7 Drawing Sheets

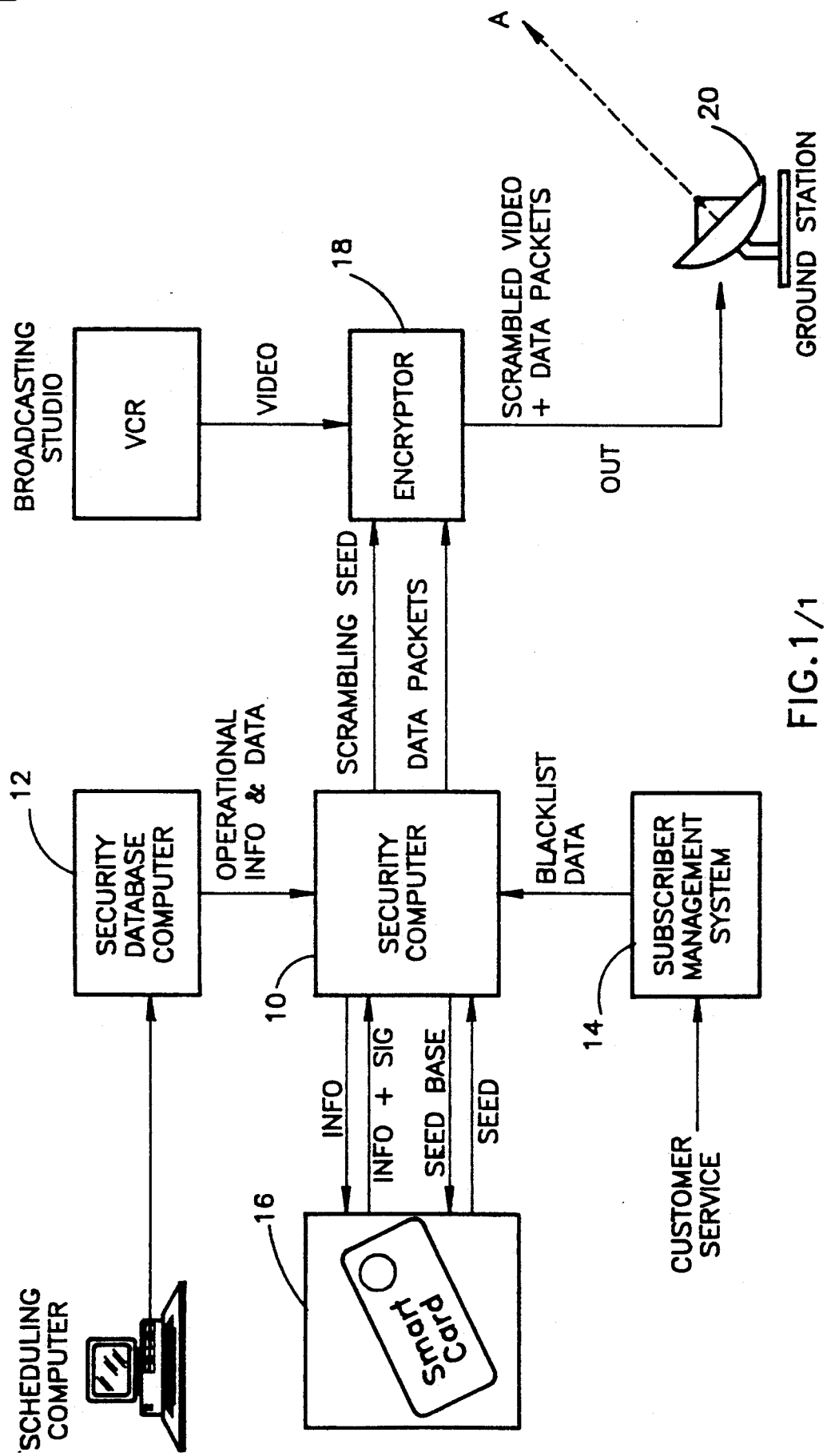
FIG.1/1

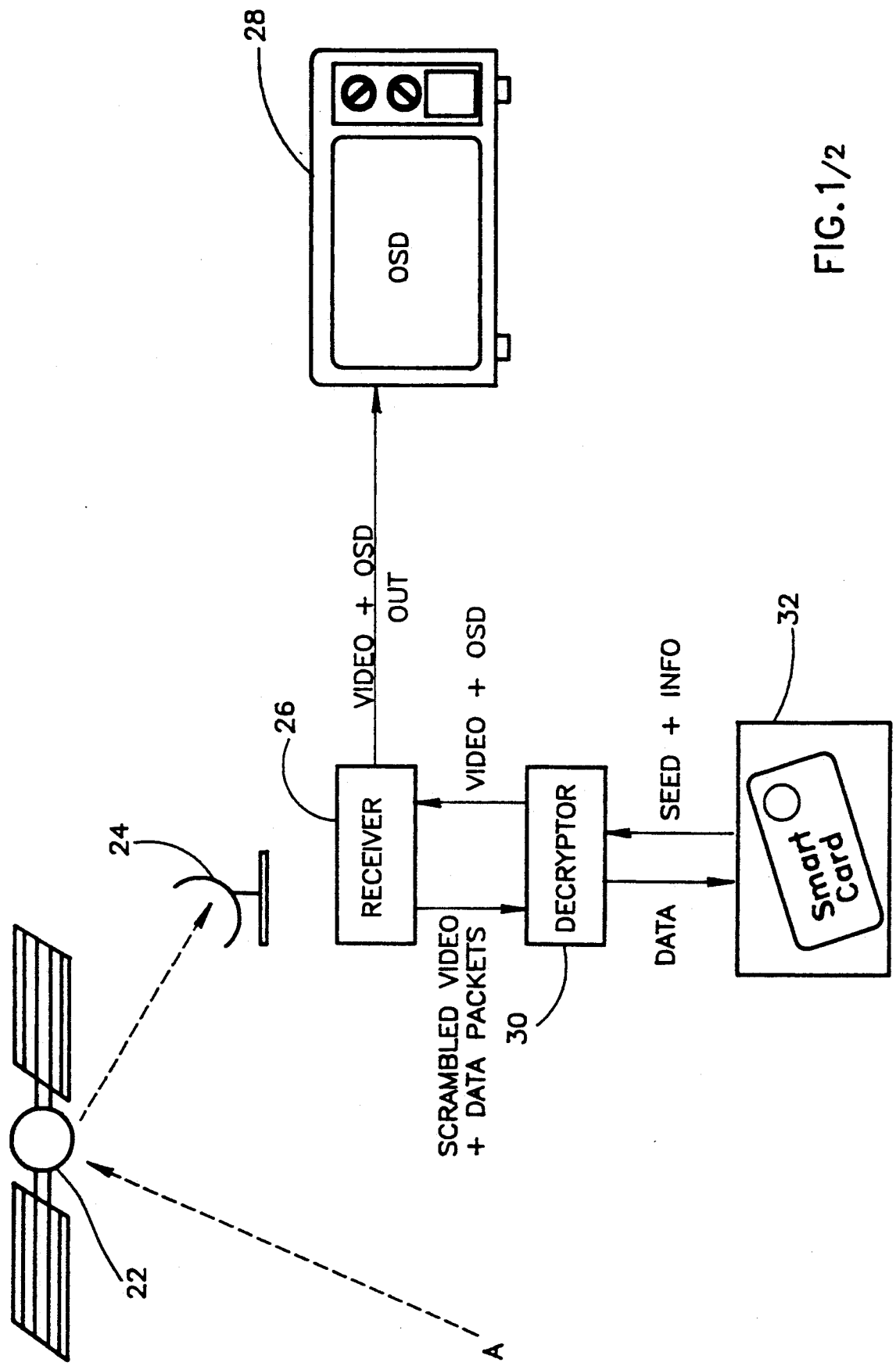
FIG.1/2

SYSTEM FOR CONTROLLING ACCESS TO BROADCAST TRANSMISSIONS

This application is a continuation of application Ser. No. 07/611,960 filed on Nov. 9, 1990, abandoned as of the filing of this application, based on Israel application 92310 filed Nov. 14, 1989.

FIELD OF THE INVENTION

The present invention relates to broadcast transmission systems and techniques.

BACKGROUND OF THE INVENTION

There is known in the patent literature a great variety of systems and techniques for broadcast transmission. More particularly systems for controlling access to broadcast transmissions are described in the following publication: *Satellite and Cable TV Scrambling and Descrambling*, by Brent Gale and Frank Baylin, published by Baylin/Gale Productions, Boulder, Colorado, 1986.

Smart cards, plastic cards resembling credit cards with microprocessor inside of them, are known in the art. They are described in the book, *Smart Cards, The New Bank Cards*, by Jerome Svigals and published by Macmillan Publishing Company, N.Y., 1987.

SUMMARY OF THE INVENTION

The present invention seeks to provide improved apparatus and techniques for controlling access to broadcast transmissions. For the purposes of the present specification and claims, broadcast transmissions are deemed to include both audio and video, combined and separately; whether transmitted by wire or by wireless techniques.

There is thus provided in accordance with a preferred embodiment of the present invention a system for controlling access to broadcast transmissions including a transmitter having a transmission scrambler for scrambling the broadcast, a multiplicity, of subscriber receivers, each having an identical receiving descrambler containing no secret cryptographic keys, for descrambling the broadcast and a plurality of selectable and portable executing apparatus each being operatively associatable with a receiving descrambler at a partially different given time and each executing generally identical operations to generate a seed for use by the associated receiving descrambler to enable the receiving descrambler to descramble the broadcast.

In accordance with a preferred embodiment of the present invention, the executing apparatus includes apparatus for actively executing an algorithm.

In accordance with another embodiment of the present invention, the executing apparatus includes apparatus for providing instructions and data for an algorithm executed in the descrambler.

In accordance with one embodiment of the present invention, the executing apparatus includes provides all of the instructions required to descramble the transmission. In accordance with another embodiment of the present invention, the executing apparatus provides only part of the instructions required to descramble the transmission.

In accordance with a preferred embodiment of the present invention, the executing apparatus comprises apparatus for providing proof of authenticity to the receiving descrambler. The proof of authenticity is preferably a public key proof of authenticity and preferably a Fiat-Shamir public key proof of authenticity.

In accordance with a preferred embodiment of the present invention, each executing apparatus contains a separate identification element which is sensible by a descrambler.

Further, in accordance with a preferred embodiment of the present invention, each executing apparatus comprises an element which indicates programming entitlements to the descrambler.

In accordance with a preferred embodiment of the present invention, the element which indicates programming entitlements to the descrambler is modified by information contained in the transmitted broadcast.

In accordance with a preferred embodiment of the present invention, the descrambler comprises a mailbox for receiving data from broadcast transmissions and from the a first of the plurality of selectable executing apparatus. Further, in accordance with a preferred embodiment of the present invention, the executing apparatus is operative to access the mailbox. Such data may include, for example, activation data for enabling operation of the executing apparatus and entitlement information.

In accordance with a preferred embodiment of the present invention, the executing apparatus may contain information which can be accessed by the descrambler for modifying software thereof.

In accordance with a preferred embodiment of the present invention, the executing apparatus comprises apparatus for generating displayed messages via the descrambler.

In accordance with a preferred embodiment of the present invention, the descrambler is operative to generate displayed messages originating from any of the following sources: the broadcast, the descrambler and the executing apparatus.

Further, in accordance with a preferred embodiment of the present invention, the displayed messages may be assigned designated priorities.

There is provided, in accordance with the present invention, a system for transferring information comprising a plurality of portable card apparatus each comprising microprocessor apparatus for generating and transmitting data to be stored and fixed storage apparatus for receiving the data from a first of the plurality of card apparatus, for storing the data, and for enabling a second of the plurality of card apparatus to remove the data therefrom.

There is additionally provided, in accordance with the present invention, a system for transferring information comprising computing apparatus for generating and transmitting a first set of data to be stored, a plurality of portable card apparatus each comprising microprocessor apparatus for generating and transmitting a second set of data to be stored and fixed storage apparatus for receiving at least one of the first and second data from the computing apparatus and a first of the plurality of card apparatus, for storing the information, and for enabling a second of the plurality of card apparatus to remove the at least one of the first and second data therefrom.

BRIEF DESCRIPTION OF THE DRAWING

The present invention will be understood and appreciated more fully from the following detailed description, taken in conjunction with the drawings in which:

FIGS. 1/1-1/2 make up a generalized block diagram illustration of a broadcast system constructed and operative in accordance with a preferred embodiment of the present invention;

DETAILED DESCRIPTION OF A PREFERRED EMBODIMENT

Figure 2:
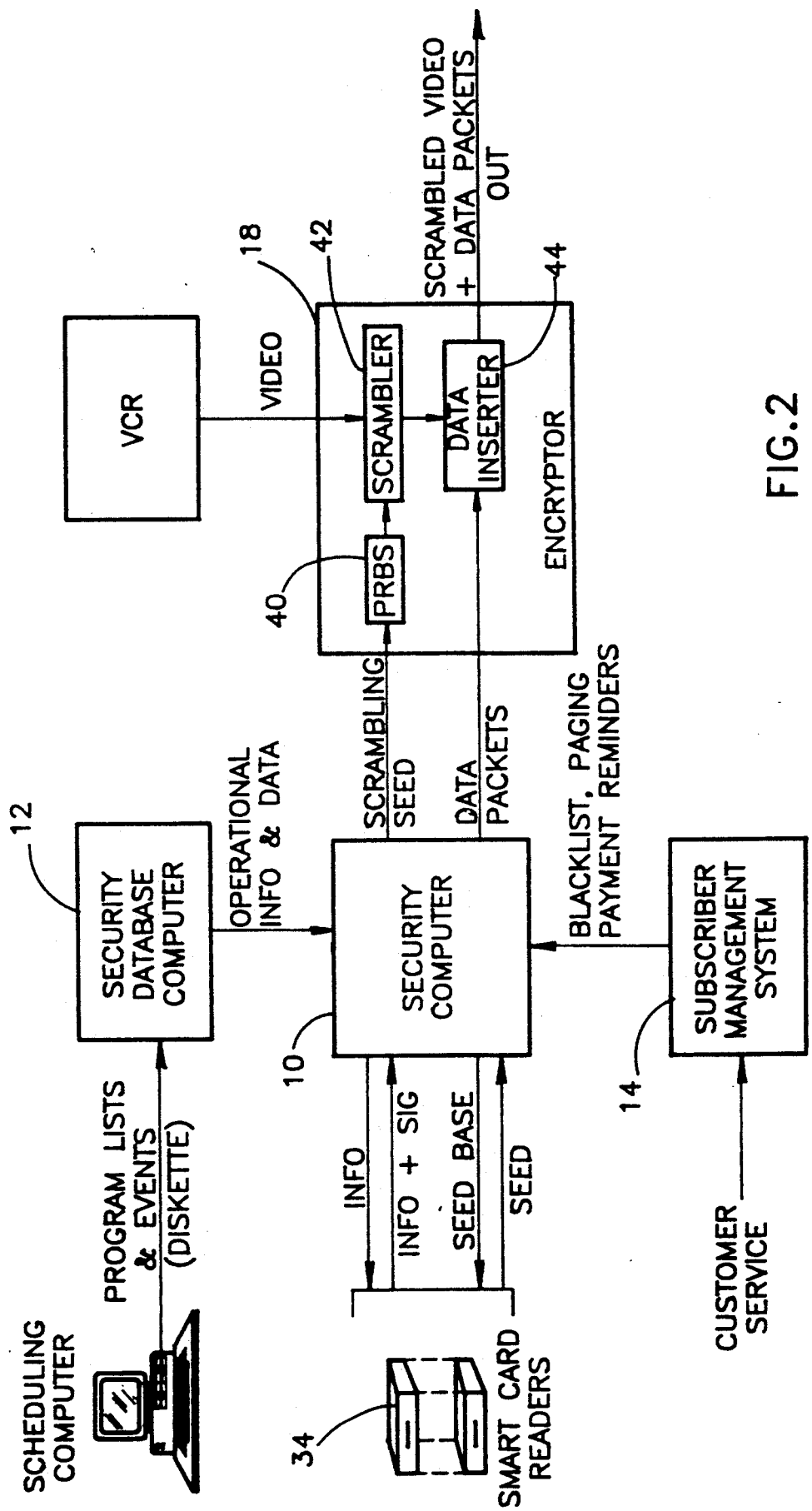
FIG. 2 is a more detailed block diagram illustration of the transmission end of the system of FIG. 1.

Reference is now made to FIGS. 1/1-3, which illustrate the broadcast system constructed and operative in accordance with a preferred embodiment of the present invention. The broadcast system preferably comprises a security computer 10, such as an IBM AT having multiple serial communications links. The security computer 10 receives inputs from a security database computer 12, such as an IBM AT, which stores programming information as well as information relating to urgent or periodic subscriber actions. Typically an urgent subscriber action could consist of immediate, on-line activation, deactivation or re-activation of viewing entitlements. Typically a periodic subscriber action is a blacklisting order or a message to be transmitted periodically so that when the subscriber is tuned to the system, the order or message will be received and suitably processed.

The security computer 10 also receives an input from a subscriber management system 14, typically embodied in a large mainframe computer, commercially available from IBM or other major manufacturers. The subscriber management system stores details of all subscribers, their payment status and their entitlements.

In accordance with a preferred embodiment of the invention, the security computer 10 interfaces with one or more smart cards 16. Such smart cards are well known and are described in *Smart Cards, The New Bank Cards*, by Jerome Svigals. The smart cards preferably contain two computer programs. The first computer program contains a seed generating algorithm for producing a seed which is used in signal scrambling and descrambling at both ends of the system. The second program contains a signature protocol which appends a suitably hashed signature to all information regarding entitlements when transmitted over the system.

The security-computer 10 supplies data, including, inter alia, unscrambled data, data bearing a signature and a seed to an scrambler 18, which typically is located on the premises of a broadcasting station.

The operation of the apparatus of elements 10, 12, 14 and 16 may be emulated by a computer program whose object code is attached hereto as Annex A.

The scrambler 18 is typically an scrambler which is commercially available from Thomson CSF Laboratoires Electroniques de Rennes, Cesson-Sevigne, France. The scrambler 18 is operative, using the seed received via the security computer 10, to scramble all or part of an audio-video TV program received from any suitable program source, such as a VCR. The scrambler 18 is also operative to modulate the data which is received from the security computer so as to enable both the scrambled program and the data to be transmitted together. It will be appreciated that the seed is not modulated and thus, is not transmitted.

The modulation technique may be selected at will from known techniques provided that it is suitable for use with the scrambler 18. In accordance with a preferred embodiment of the invention, the data is inserted on unused video lines.

The output of the scrambler 18 is broadcast by any suitable technique, either by wire or wireless apparatus. In the illustrated embodiment, the scrambler outputs to a ground station 20, which communicates via a satellite 22 in geosynchronous orbit of the earth with a multiplicity of receiving ground stations 24, each representing a subscriber.

The signals received by each receiving ground station 24 are supplied to a receiver 26, typically commercially available from Amstrad of the UK. The receiver 26 is operative to convert the signals received thereby, which are selected by the subscriber, to baseband video. If the baseband video does not require descrambling, the receiver 26 remodulates the baseband video typically on a preselected channel for reception and display on a conventional television display 28.

Scrambled signals are supplied by the receiver 26 to a descrambler 30, typically commercially available from Ferguson Limited, Enfield, Middlesex, England or from Thomson L.E.R.E.A. Illkirch, France.

In accordance with a preferred embodiment of the present invention, the descrambler is operative together with a smart card 32, which contains a seed generation algorithm. It is a particular feature of the present invention, that the descramblers contain no cryptographic secrets and that each of the smart cards 32 associated with the multiplicity of receivers 26 execute the identical seed generation algorithm on the data sent from the security computer 10 and thus, produce the identical seed used by scrambler 18 to scramble the broadcast signal. It is an additional feature of the present invention that the receivers 26 are identical and the smart card 32 from one subscriber can operate in the receiver 26 of a second subscriber, thereby allowing the second subscriber to view, in his home, the programs received by the first subscriber.

In accordance with an alternative embodiment of the invention, the use of either or both of smart cards 16 and 32 may be eliminated in favor of simpler, but less secure memory cards. In such a case, the memory card contains data but not the seed generating algorithm. In such a case, the security computer 10 transmits instructions to the descrambler 30 enabling it to use the data in the memory card to reproduce the seed.

In the embodiment wherein cards 16 and 32 or at least card 32 is a smart card, the smart card 32 includes a first program which verifies the genuineness of the hashed signature produced by card 16 and transmitted through the system, thus rejecting entitlement data bearing no signature or a non-genuine signature. The smart card 32 also contains a program for generating the seed for enabling the descrambler to descramble the video TV program. The object code for a smart card 32 manufactured by News Gem Smartcard International Ltd. of Livingston, Scotland, is attached hereto as Annex B.

Reference is now made to FIG. 2 which illustrates the transmission apparatus of the present invention. As mentioned hereinabove, security computer 10 receives subscriber and programming data from subscriber management system 14 and security database 12. Security computer 10 sends a portion of the data relating to operations to be performed by smart card 32 to the smart card 16, via a smart card coupler 34, such as those commercially available from GemPlus of Gemenos, France. Smart card 16 appends a digital signature to the data for smart card 32 whereby the digital signature is generated by the second algorithm stored within the smart card 16. The smart card 16 additionally generates the scrambling seed to be used by the scrambler 18.

The two algorithms stored in smart cards 16 and 32 are typically hashing functions operating on the data for smart card 32. The hashing function of the second algorithm, that for digital signature generation, typically is iterated a few times. The hashing function of the first algorithm, that for seed generation, typically is iterated a multiplicity of times. Hashing functions are described in *The Art of Computer Programming, Vol 2:Seminumerical Algorithms* by Donald E. Knuth.

The data for smart card 32 and the scrambling seed are sent from the smart card 16 through the security computer 10 to the scrambler 18. The scrambling seed in loaded into a Pseudo-Random Bit Sequencer (PRBS) 40 which produces from it a pseudo-random sequence of bits. The sequence of bits is sent to a scrambler 42 which utilizes it to scramble the broadcast signal, which may come from a VCR.

The programming and security data as well as the data for smart card 32 is appended to the scrambled broadcast signal, by means of a data inserter 44, and the combined signal is sent to the ground station 20 to be modulated and transmitted.

Figure 3:
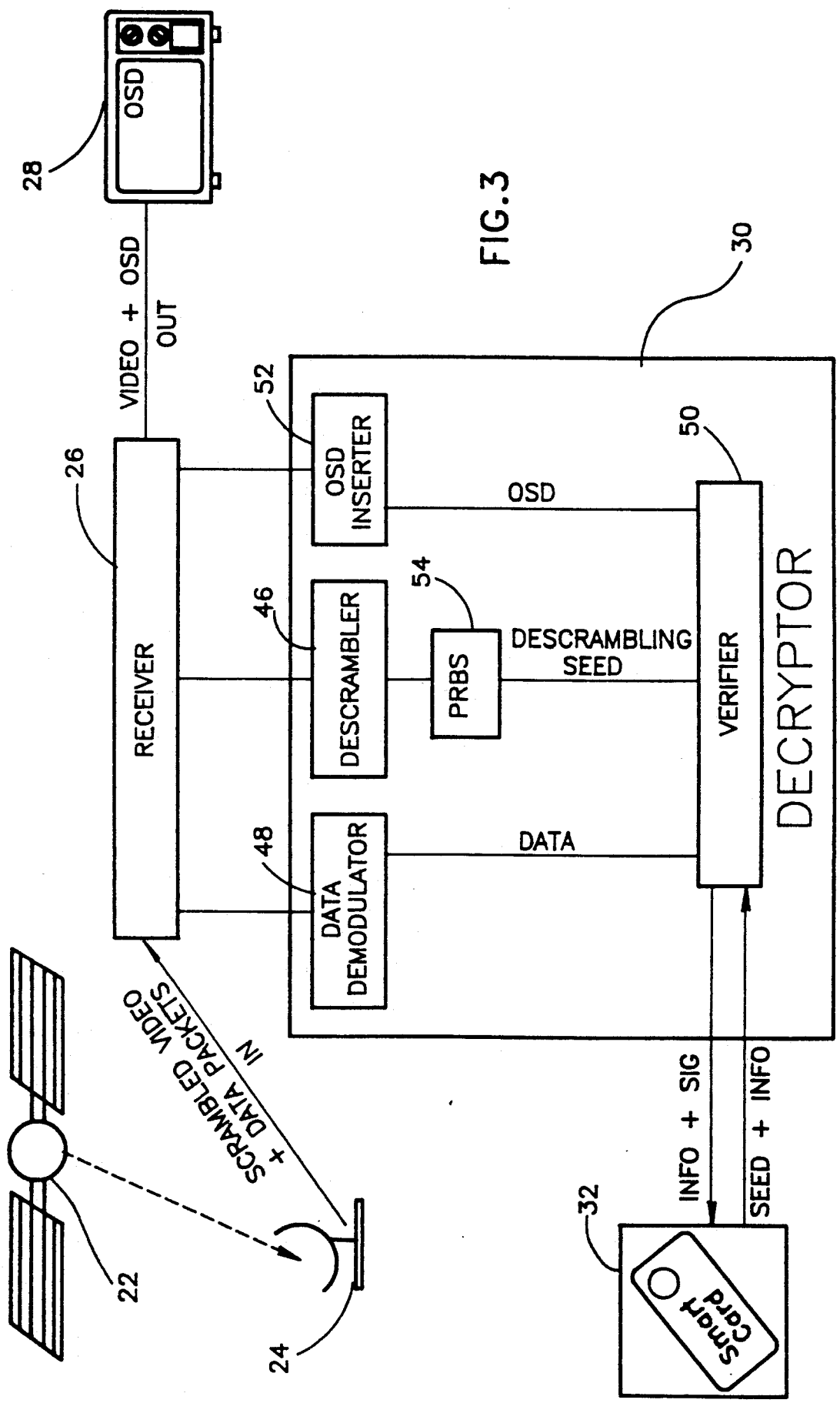
FIG. 3 is a more detailed block diagram illustration of the reception end of the system of FIG. 1.

Reference is now made to FIG. 3 which illustrates the reception end of the system of FIGS. 1/1-1/2. As mentioned hereinabove, the combined signal is received by receiving ground station 24 and is sent to receiver 26 which demodulates it into video baseband. The video baseband is then sent in parallel to both a descrambler 46 and a data demodulator 48 of descrambler 30.

Data demodulator 48 extracts the data from the combined signal and sends it to a verifier 50. Verifier 50 then sends a portion of the data to the smart card 32 for verification of entitlements and for seed generation. The portion of the data which is sent is that dealing with entitlements and seed generation.

Smart card 32 receives the data portion and, if the entitlement information enclosed therein indicates that the subscriber is entitled to view the selected program, it utilizes the data portion to generate a decoding seed which is generally equivalent to the scrambling seed. If the subscriber is not entitled to receive the video signal, the decoding seed will not match the scrambling seed. Smart card 32 also generates on-screen displays based on the received data portion. For example, the received data portion typically includes a channel identification number and the current date. If the subscriber is not entitled to view the currently selected channel, an on-screen display message such as THIS CHANNEL IS BLOCKED, is generated. If the current date is beyond an expiration date stored in smart card 32, an on-screen display message such as YOUR CARD HAS EXPIRED is generated. It will be appreciated that typically only one on-screen display message can be displayed at one time.

The generated seed and on-screen displays, if any, are sent to the verifier 50. The verifier 50 sends the on-screen displays to an on-screen display inserter 52 which inserts the display into the baseband video after it has left the descrambler 46. The decoding seed is sent to a PRBS 54 which generates a pseudo-random bit sequence, generally identical to the scrambling seed, which is utilized by the descrambler 46 for descrambling the baseband video signal.

The verifier 50 performs the following six additional functions:

1. An authentication operation, as described hereinbelow and with reference to FIG. 6, for verifying that the smart card is authentic;

2. Generation of the decoding seed, in conjunction with the security computer 10, and management of pay-per-view programs, in the embodiment where the smart card 32 comprises a memory card. The algorithm used for seed generation is a hashing function operating on data from the security computer 10. The result is used as the decoding seed if the results of instructions such as comparisons between data stored in the memory card and data sent from the security computer 10 are positive;

3. comparison of priority levels of on-screen display messages, such as between those generated by smart card 32 and those sent from the security computer 10, for determining which message should be displayed and sending of the message to the on-screen display inserter 52;

4. display of the smart card 32 identification number upon request from the security computer 10;

5. blacklisting of smart cards 32 which contain an illegal identification number, as directed by the security computer 10; and 6. maintenance of a mailbox used to store messages from an old to a new smart card and from the security computer 10 to the smart card 32. Such messages may include enabling of the new card based on the message left by the old card. For pay-per-view systems where the smart card 32 stores the amount of money initially paid by the subscriber and deletes a predetermined amount of money for each program viewed, at the end of the subscription period, the old smart card 32 leaves in the mailbox an amount of money left to the subscriber (if any). The new smart card 32 adds to the amount stored within it the amount left in the mailbox.

Executable code for a verifier 50 is incorporated into an 8052 processor from Intel.

The on-screen display inserter 52 inserts the on-screen display messages into the baseband video output of the descrambler 46 and the combined signal is sent to the receiver 26 for remodulation and for transmission to the TV set 28.

Figure 4:
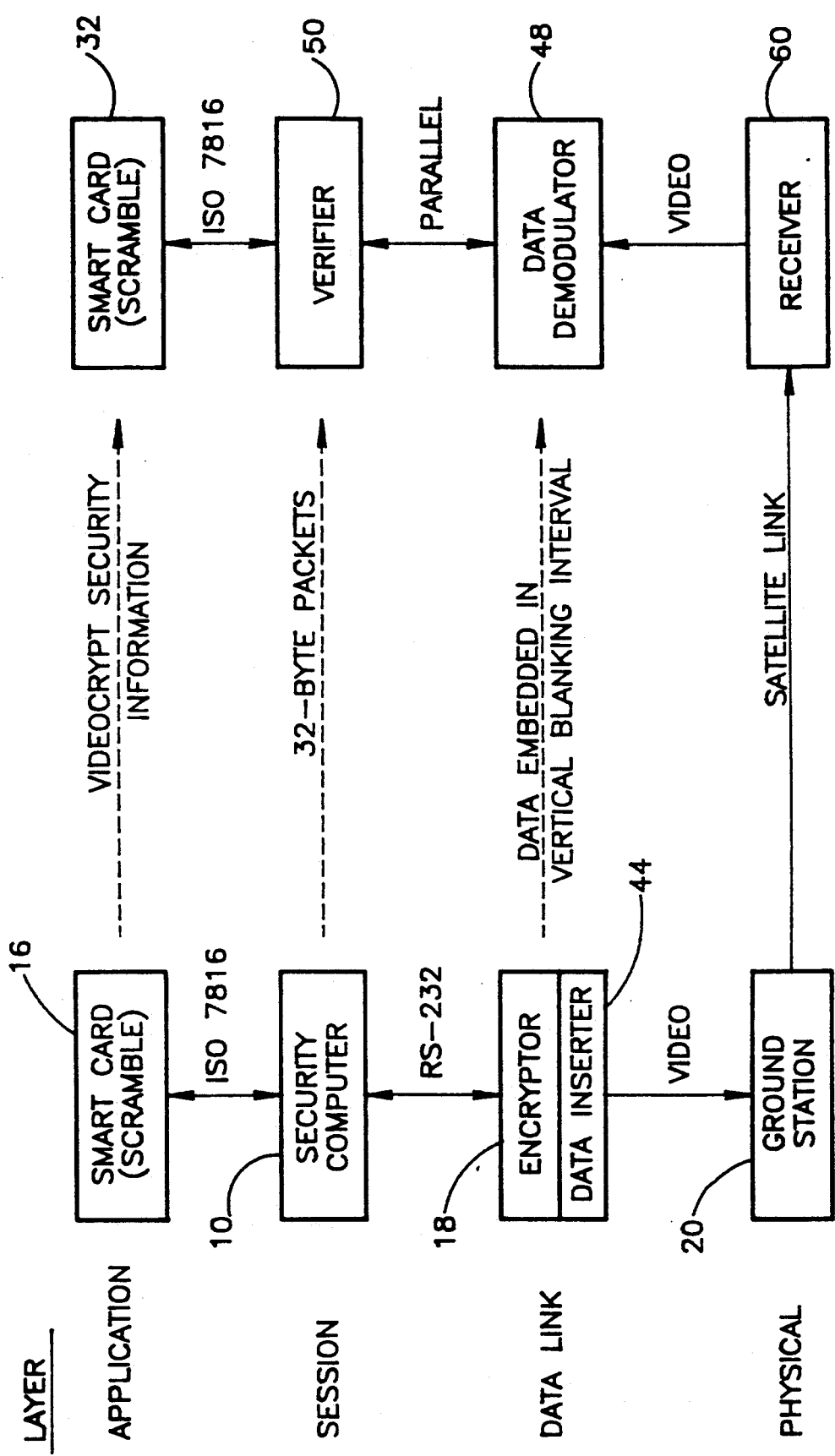
FIG. 4 is a generalized illustration of a communications protocol employed in accordance with a preferred embodiment of the invention.

Reference is now made to FIG. 4 which illustrates a communications protocol typically used in the system of the present invention. Beginning at the lowest level, the physical level, the ground station transmitter 20 transmits a broadcast signal via a satellite link to a receiver apparatus 60 which comprises ground station receiver 24 and receiver 26.

At the data level, the data is inserted into the vertical blanking interval of the broadcast signal via the data inserter 44 of the scrambler 18 and removed via the data demodulator 48 of descrambler 30. The scrambler 18 and descrambler 30 may communicate between themselves without affecting the operation of the system of the present invention.

At the session level, the security computer 10 communicates with the verifier 50 of descrambler 30 via data packets of the data. In the preferred embodiment of the present invention, the data packets are 32-byte packets. The information passed is system and subscriber information, authorization to perform the authentication operation and/or to display the smart card identification number, as described hereinabove. The session level communicates with the data level via an RS-232 protocol between the security computer 10 and the scrambler 18 and via a parallel communication protocol between the verifier 50 and the data demodulator 48.

Finally, the application level is a communication level between the smart card 16 attached to the security computer 10 and the smart card 32 attached to the descrambler 30. The information passed relates to seed and signature generation, and channel and date information.

Figure 5:
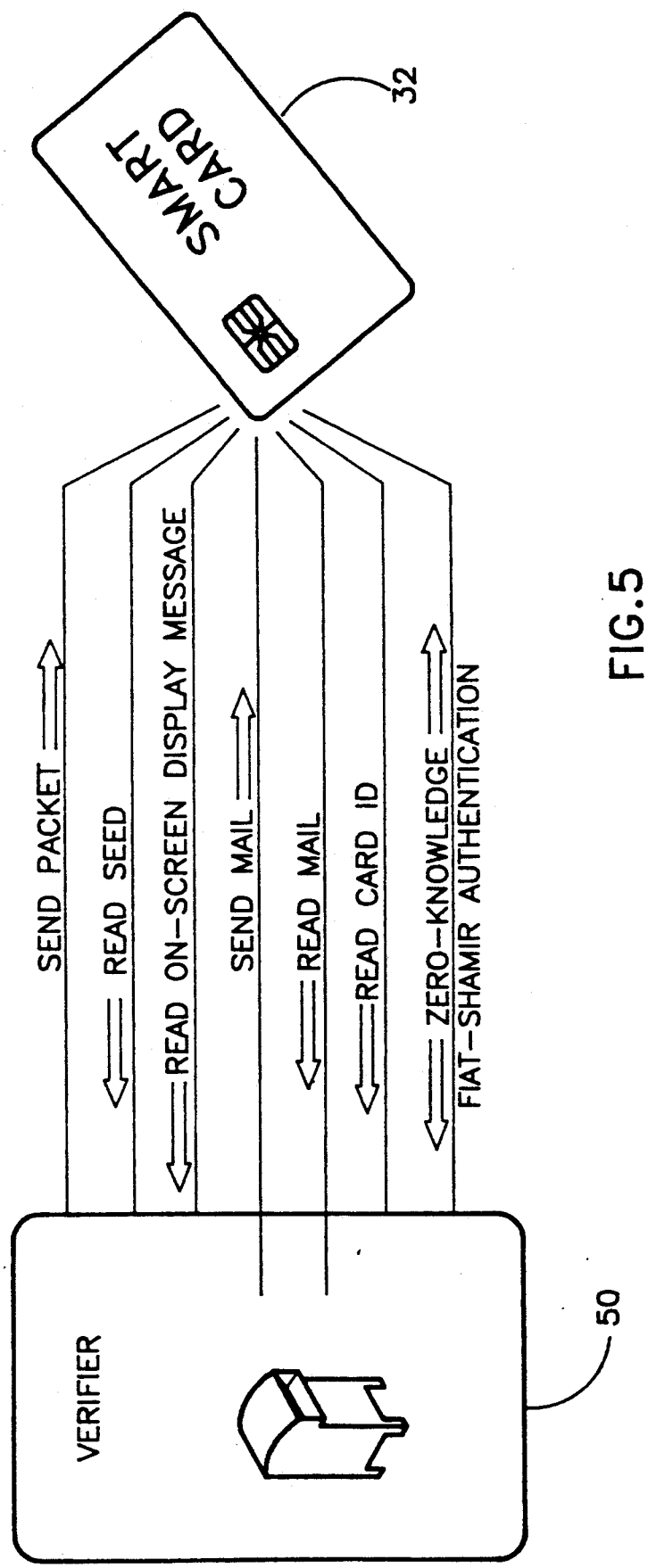
FIG. 5 is an illustration of a information exchange protocol for use with a verifier and a smart card in accordance with a preferred embodiment of the present invention.

Reference is now made to FIG. 5 which illustrates a communications protocol between smart card 32 and verifier 50. Verifier 50 sends a data packet to the smart card 32 and the smart card 32 operates on the data packet to generate a decoding seed and on-screen display messages. Additionally, the smart card 32 receives mail from the mailbox of verifier 50 as well as sends mail to the mailbox.

In accordance with a preferred embodiment of the present invention, the verifier 50 reads the card identification number of the smart card 32 which is stored in the memory of the smart card. Moreover, upon instruction from the security computer 10, as transmitted in the data packet, the verifier 50 and smart card 32 perform an authentication process.

Figure 6:
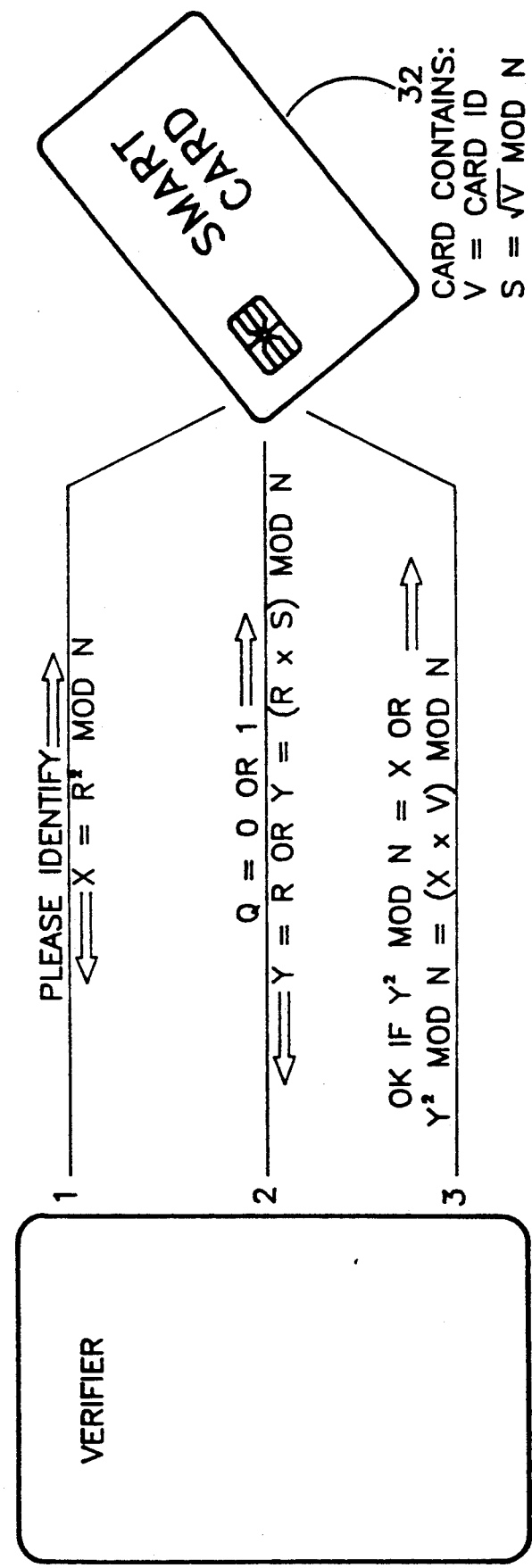
FIG. 6 is an illustration of a Fiat-Shamir authentication protocol useful in the present invention.

The authentication process is illustrated in FIG. 6 and discussed in detail in U.S. Pat. No. 4,748,668 to Shamir which is incorporated herein by reference. Smart card 32 has stored in it a card identification number, denoted V in FIG. 6, a second number, denoted S, and a modulus N, which is also stored in verifier 50. N is a public modulus which is a multiple of two values P and Q where P and Q are two prime numbers, typically of many digits, known only to the system which generates the smart cards. S is defined as:

$$S = (\sqrt{V})^* \text{Mod } N \quad (1)$$

where the square root is performed as a modular square root. Modular arithmetic is discussed on pages 268–278 of *The Art of Computer Programming, Vol. 2:Seminumerical Algorithms*, written by Donald E. Knuth and published by Addison-Wesley Publishing Company, Reading, Massachusetts.

The authentication process operates as follows. Verifier 50 requests a number X from smart card 32 where X is defined as:

$$X = R^{2*} \text{Mod } N \quad (2)$$

where R is an arbitrary number. The verifier 50 then responds with a query bit Q, received from the security computer 10, whose value is randomly either 0 or 1. The smart card 32 then responds with a value Y where Y is defined as:

$$Y = R, \quad \text{if } Q = 0 \quad (3)$$

$$Y = (R^*S) \text{LMod } N \quad \text{if } Q = 1 \quad (4)$$

The smart card 32 is authenticated if the verifier 50 calculates the following values for $Y^2$.

$$Y^2 = X^* \text{Mod } N \quad \text{if } Q = 0 \quad (5)$$

$$Y^2 = (X^*V)^* \text{Mod } N \quad \text{if } Q = 1 \quad (6)$$

where the verifier 50 received V from the smart card 32 prior to the authentication process.

It will be appreciated by persons skilled in the art that the present inventions is not limited by what has been particularly shown and described hereinabove. Rather the scope of the present invention is defined only by the claims which follow:

We claim:

1. A system for controlling access to broadcast transmission comprising:
    a transmitter having a transmission scrambler for scrambling a broadcast;
    a multiplicity of subscriber receivers, each comprising a receiving descrambler for descrambling said broadcast; said system further comprising
    a plurality of selectable and portable executing means each being operatively associated with any one receiving descrambler and each executing identical operations to generate a seed for use by said associated receiving descrambler to enable said receiving descrambler to descramble said broadcast.

2. A system as in claim 1 and wherein said executing means includes means for actively executing an algorithm.

3. A system as in claim 1 and wherein each of said plurality of executing means includes means for providing instructions and data for an algorithm executed in one said descrambler.

4. A system as in claim 1 and wherein each of said plurality of executing means includes means for providing all instructions required to descramble said broadcast.

5. A system as in claim 1 and wherein each of said plurality of executing means includes means for providing a portion of instructions required to descramble said broadcast.

6. A system as in claim 1 and wherein each of said plurality of executing means comprises means for providing proof of authenticity to one said receiving descrambler.

7. A system as in claim 6 and wherein said executing means comprises a public key proof of authenticity.

8. A system as in claim 6 and wherein said executing means comprises a Flat-Shamir public key proof of authenticity.

9. A system as in claim 1 and wherein each of said plurality of executing means contains a separate identification element and wherein each descrambler is responsive to the identification element contained by an operatively associated one of the plurality of executing means.

10. A system as in claim 1 and wherein each of said plurality of executing means contains information which indicates programming entitlements to one said descrambler.

11. A system as in claim 10 and wherein said information which indicates programming entitlements to said descrambler is modified by information contained in said transmitted broadcast.

12. A system as in claim 1 and wherein each said descrambler comprises an electronic mailbox for receiving data from broadcast transmissions and from one of said plurality of selectable and portable executing means.

13. A system as in claim 12 and wherein said executing means is operative to access said mailbox.

14. A system as in claim 12 and wherein said data from broadcast transmissions and from said one of said plurality of selectable and portable executing means comprises entitlement information and activation data for enabling operation of said subscriber receiver.

15. A system as in claim 1 and wherein said executing means contains information which can be accessed by said descrambler for modifying software thereof.

16. A system as in claim 1 and wherein each of said plurality of executing means comprises means for generating displayed messages by means of said descrambler.

17. A system as in claim 16 and wherein said displayed messages have assigned designated priorities.

18. A system as in claim 1 and wherein each said descrambler is operative to generate displayed messages originating from any of the following sources: said broadcast, said descrambler and an individual one of said plurality of executing means.

19. A system for controlling access to broadcast transmissions according to claim 1 wherein each said receiving descrambler is identical.

20. A system for controlling access to broadcast transmissions according to claim 19 wherein each said receiving descrambler contains no encrypted material and wherein the identical operations executed by each of the selectable and portable executing means comprise a hashing function.

21. A system as in claim 19 and wherein each of said plurality of executing means includes means for executing an algorithm.

22. A system as in claim 19 and wherein each of said plurality of executing means includes means for providing instructions and data for an algorithm executed in one said descrambler.

23. A system as in claim 19 and wherein each of said plurality of executing means includes means for providing all instructions required to descramble said broadcast.

24. A system as in claim 19 and wherein each of said plurality of executing means includes means for providing a portion of instructions required to descramble said broadcast.

25. A system as in claim 19 and wherein each of said plurality of executing means includes means for providing proof of authenticity to one said receiving descrambler.

26. A system as in claim 19 and wherein each of said plurality of executing means contains a separate identification element and wherein each descrambler is responsive to the identification element contained by an operatively associated one of the plurality of executing means.

27. A system as in claim 19 and wherein each of said plurality of executing means comprises an element which indicates programming entitlements to said descrambler.

28. A system as in claim 19 and wherein each of said plurality of executing means comprises means for generating displayed messages by means of one said descrambler.

29. A system for controlling access to broadcast transmissions according to claim 1 wherein each said receiving descrambler contains no encrypted material and wherein the identical operations executed by each of the selectable and portable executing means comprise a hashing function.

30. A system as in claim 29 and wherein each of said plurality of executing means includes means for executing an algorithm.

31. A system as in claim 29 and wherein each of said plurality of executing means includes means for providing instructions and data for an algorithm executed in one said descrambler.

32. A system as in claim 29 and wherein each of said plurality of executing means includes means for providing all instructions required to descramble said broadcast.

33. A system as in claim 29 and wherein each of said plurality of executing means includes means for providing a portion of instructions required to descramble said broadcast.

34. A system as in claim 29 and wherein each of said plurality of executing means includes means for providing proof of authenticity to one said receiving descrambler.

35. A system as in claim 29 and wherein each one of said plurality of executing means contains a separate identification element and wherein each descrambler is responsive to the identification element contained by an operatively associated one of the plurality of executing means.

36. A system as in claim 29 and wherein each of said plurality of executing means comprises an element which indicates programming entitlements to one said descrambler.

37. A system as in claim 29 and wherein each of said plurality of executing means comprises means for generating displayed messages by means of said descrambler.

38. A system for transferring information comprising:
a plurality of portable card means each comprising authentication means employing at least one of a hashing function and a signature scheme wherein each individual one of the plurality of portable card means comprises microprocessor means for generating and transmitting data to be stored; and
fixed storage means for receiving said data from a first of said plurality of card means, for storing said data, and for enabling a second of said plurality of card means to remove said data therefrom utilizing at least one of said hashing function and said signature scheme for authentication.

39. A system for transferring information comprising:
computing means for generating and transmitting a first set of data to be stored;
a plurality of portable card means each comprising authentication means employing at least one of a hashing function and a signature scheme wherein each individual one of the plurality of portable card means comprises microprocessor means for generating and transmitting a second set of data to be stored; and
fixed storage means for receiving at least one of said first and second data from said computing means and a first of said plurality of card means, for storing said information, and for enabling a second of said plurality of card means to remove said at least one of said first and second data therefrom utilizing at least one of said hashing function and said signature scheme for authentication.

* * * * *